Nov. 3, 1931.  W. S. GLENNAN  1,830,228
LANDING CARRIAGE FOR AIRCRAFT
Filed Oct. 28, 1929  2 Sheets-Sheet 1
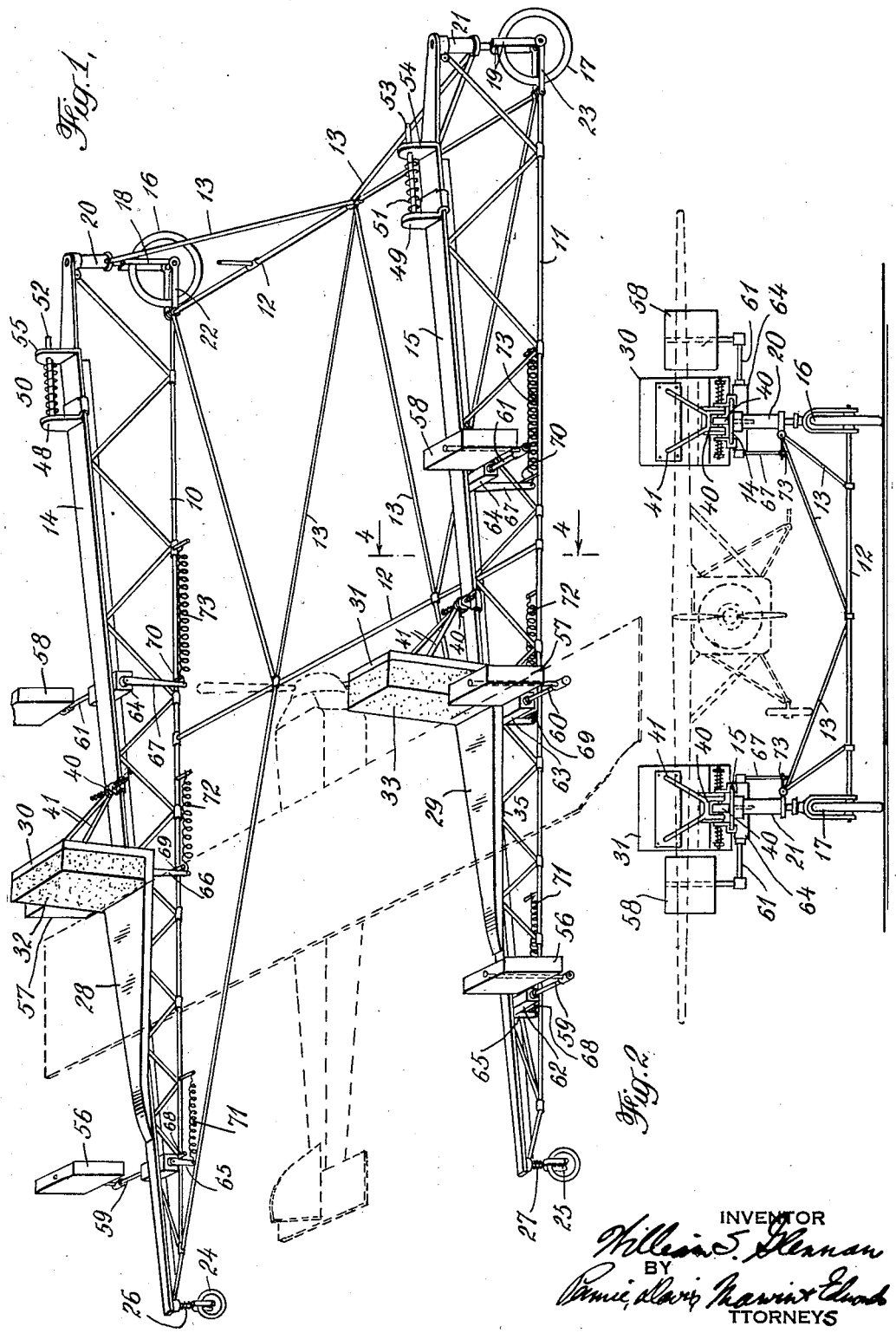
INVENTOR
William S. Glennan
BY
ATTORNEYS Nov. 3, 1931. W. S. GLENNAN 1,830,228
LANDING CARRIAGE FOR AIRCRAFT
Filed Oct. 28, 1929 2 Sheets-Sheet 2
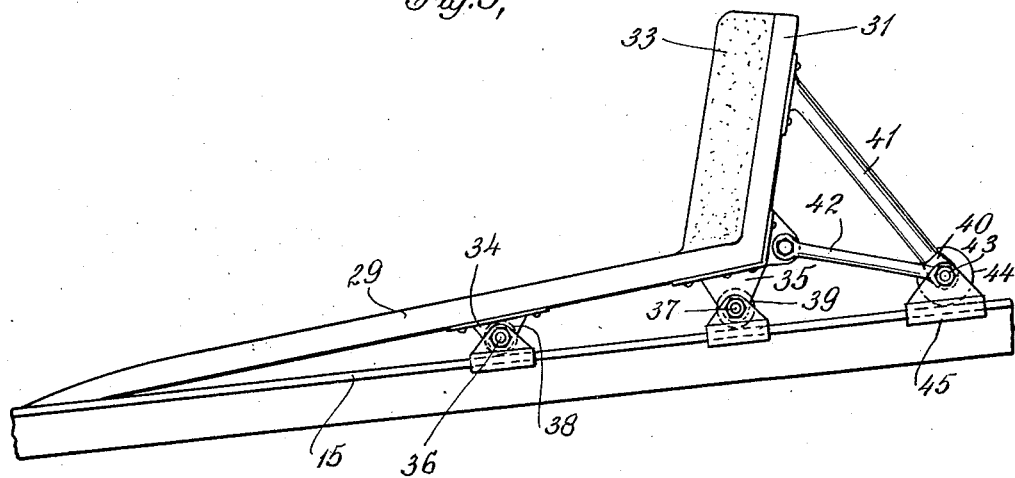
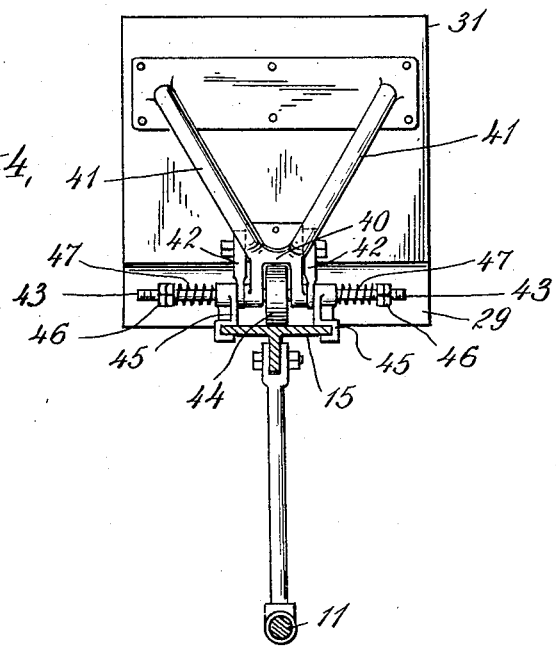
INVENTOR
William S. Glennan
BY
Burns, Davis, Marvin & Edwards
ATTORNEYS Patented Nov. 3, 1931

1,830,228

UNITED STATES PATENT OFFICE

WILLIAM S. GLENNAN, OF NORFOLK, VIRGINIA

LANDING CARRIAGE FOR AIRCRAFT

Application filed October 28, 1929. Serial No. 402,951.

This invention relates to a carriage for receiving landing aircraft and has particular reference to a device for use on aeroplane landing fields or the like for emergency purposes in cases where the landing gear of an aircraft has become damaged or otherwise ineffective for landing purposes, and the like.

The damaging of landing gear by engagement with some object while taking off, or the loss of a wheel while flying, have resulted in serious accidents to occupants of aircraft and damage to the craft when attempting to land with the ineffective landing gear. Also when the surface of the landing field has become soggy as the result of long rainy periods or heavy rains, landing is dangerous because the wheels dig into the soft surface upon impact, and the momentum of the craft causes it to tend to nose over or slide with the consequent danger of injury to the occupants and damage to the craft.

The principal object of this invention is to provide a device of the type described whereby these difficulties may be obviated and which may be supplied to a landing field for the express purpose of receiving aircraft under any conditions, especially when the landing gear of the aircraft has become ineffective, when it is desired to land the aircraft in a small space, or when the conditions of a landing field are such as to prevent the normal safe landing of aircraft.

These and other objects of this invention are obtained in a preferred embodiment consisting of a frame mounted upon wheels, skids, or other means which render it mobile, this frame having devices for receiving the landing craft in such a way that the impact of the craft is either absorbed completely thereby, or jointly thereby and by the mobility of the frame, which responds to the impact of the landing craft by moving over the surface of the ground until the landing force of the craft is dissipated.

The devices for receiving the craft may be any suitable shock absorbing means, whereby the landing speed and impact of the craft are reduced and eventually absorbed. Such devices preferably consist of cushioned members slidably mounted for movement on the frame in response to the impact of the craft, this movement of the members being retarded by braking means of any suitable type. Also, separate retarding means are preferably provided in the way of a series of members lying in the path of movement of the craft, these members being progressively overcome by the craft with the resulting effect of progressively retarding its movement, until it has stopped on the frame, although the frame bearing the craft may continue to move over the surface of the ground or the like. These or separate members may also serve to prevent relative reverse movement of the plane on the mobile frame when the sudden impact of the heavy craft causes the relatively light frame to jump forwardly, these members being placed against the rear edges of the wings, whereby the craft is located in place on the carriage.

The carriage is adapted to be placed on an aeroplane landing field or the like in such a way that a craft may land safely thereon when damaged or under any other conditions. The carriage is simple in construction, light in weight, and may be drawn from a shed by several men for placement anywhere on the landing field in response to a distress signal from a damaged plane.

For a better understanding of this invention, reference is made to the accompanying drawings, in which Figure 1 is a perspective view of a preferred embodiment of the landing carriage of this invention;

Fig. 2 is a front view thereof; and

Figs. 3 and 4 are enlarged views of the devices for receiving the landing craft.

In these drawings numerals 10 and 11 designate a pair of triangular-shaped trusses which are tied together by struts 12 and braced by rods 13 to form a rigid frame.

The triangular-shaped trusses 10 and 11 are fitted on their top edges with flanged rails 14 and 15, respectively, these rails tapering laterally from front to back. Mounted upon the front ends of trusses 10 and 11 are wheels 16 and 17, respectively, these wheels being mounted in forks 18 and 19, respectively, the upper ends of which are slidably mounted in shock absorbers 20 and 21, respectively, which are secured to the under side of the front ends of rails 14 and 15. The lower ends of the forks 18 and 19 at the axles of wheels 16 and 17 are pivotally connected by respective links 22 and 23 to the lower rails of trusses 10 and 11 respectively. The rear ends of the trusses 10 and 11 are supported upon swivelled wheels 24 and 25, respectively, through the shock absorbers 26 and 27, respectively, which are mounted upon the under surfaces of the rear ends of rails 14 and 15, respectively. The carriage thus formed is mobile and strong, and is adapted to withstand a considerable shock.

Slidably mounted upon rails 14 and 15, are respective triangular plate-like members 28 and 29, the rear ends of which are tapered and depressed so as to slide upon the surfaces of plates 28 and 29 merge with the surfaces of rails 14 and 15, as is shown particularly in Figs. 1 and 3. The front ends of plates 28 and 29 are turned upwardly in a substantially vertical direction to form guards 30 and 31 respectively. These guards 30 and 31 are provided with cushions 32 and 33 respectively, these cushions being of any soft resilient material such as sponge rubber or the like. Secured to the under sides of plates 28 and 29 are yokes 34 and 35, through which pass the axle rods 36 and 37, respectively. Journalled upon these axle rods 36 and 37 are wheels 38 and 39, respectively, which are adapted to roll upon the upper surfaces of the rails 14 and 15. A fork 40 is connected by rods 41 to the front surfaces of guard plates 30 and 31, and by links 42 to the front edge of plates 28 and 29. Journalled on axle rod 43 passing through fork 40 is a third wheel 44 which also rolls upon the upper surfaces of rails 14 and 15, as shown particularly in Figs. 3 and 4.

Inasmuch as the retarding mechanism are mounted on axles 36, 37 and 43, it will be sufficient to describe only one of them, namely the mechanism mounted on axle 43, which is shown in detail in Fig. 4. This mechanism includes a pair of slides 45 embracing opposite flanges of rail 15, these slides being slidably mounted upon axle rod 43 so as to be movable axially thereon. The ends of axle rod 43 are threaded and carry the adjusting nuts 46, between which the slides 45 are mounted the coil springs 47, the adjustment of these springs being possible by means of nuts 46, whereby the frictional resistance of slides 45 in the flanges of rail 15 may be varied. Although this mechanism has been described in connection with rail 15, the same mechanism is mounted on rail 14, since both sides of the apparatus are identical.

It will be seen that, because of the tapering of rails 14 and 15 from front to rear, the movement of the receiving means 29, 31, 33 and 28, 30, 32, is retarded as it moves from front to rear, the spreading of the slides 45 because of the tapering of rails 14 and 15 increasing the friction between slides 45 and the flanges of rails 14 and 15. Mounted near the front ends of rails 14 and 15 are stops 48 and 49, respectively, these stops being slidable on the rails against the tension of springs 50 and 51, mouted on guide rails 52 and 53, slidably mounted upon brackets 54 and 55, secured to the front ends of rails 14 and 15, respectively. The maximum forward movement of devices 28, 30, 32, 29, 31, 33, is thus limited by their respective stops 48 and 49.

Spaced along rails 14 and 15 are a series of stop members 56, 57, and 58, which consists of padded plates mounted upon horizontal shafts 59, 60 and 61, journalled in bearings 62, 63 and 64, secured upon the trusses 10 and 11. The outer ends of horizontal shafts 59, 60 and 61 are fitted with cranks 65, 66 and 67, respectively, whose movement in a counter-clockwise direction is retarded by stops 68, 69 and 70, and whose movement in a clockwise direction is restrained by springs 71, 72 and 73, respectively, the latter spring being stronger than the former two springs, and the second spring 72 being in turn stronger than the first spring 71, so that a greater force is required to tilt member 58 forward than is required to tilt member 57 forward, and similarly, a greater force is required to tilt member 57 foward than is required to similarly tilt member 56.

It will be seen that the new device of this invention is particularly useful in cases where the landing gear of aircraft is damaged for any reason at all, such as by fouling a tree or structure in taking off, or when a loose connection results in the losing of a wheel while taking off or in the air. Even in cases where no damage to the landing gear of the craft exists, but where it is desired to land within a small area, the carriage of this invention may be used, because it absorbs the landing shock and reduces the momentum of the craft by the shock-absorbing means thereon, so that the corresponding forward movement of the carriage is much less than the travel of the plane over the ground after landing.

Also, at times when the surface of the ground is so soft as to make safe landing difficult, because of the digging in of the wheels and consequent sudden halting which causes the plane to skid, tilt, or nose over, the device of this invention will be found particularly useful, because of is greater stability, larger wheels and greater number of wheels. In such instances, the carriage of this invention is placed on a landing field or the like heading into the wind, so that as the craft lands against the wind, the pilot may guide it into the carriage in such a way that the wings of the craft light upon the rails 14 and 15 and upon the plates 28 and 29, and the fuselage lies between the trusses 10 and 11 in suspension by the wings, as illustrated in Figs. 1 and 2.

Inasmuch as the craft is still moving at considerable velocity, the front edges of the wings engage the rubber cushions 33 and 34, and the momentum of the craft causes the devices 28—30—32, and 29—31—33 to be pushed forward along the rails. Also, the momentum of the landing craft causes the whole carriage to move over the ground of the landing field, the frictional resistance of the carriage in moving over the ground reducing the landing force of the craft. Also, the frictional resistance to the sliding of the devices 28—30—32 and 29—31—33 along the respective rails 14 and 15 absorbs the momentum of the craft, this force absorption being produced by the increasing friction between the slides 45 and the tapering rails 14 and 15, as described.

In addition to these shock absorbing arrangements, the members 56, 57 and 58 are progressively tilted by the wings of the craft, and because of their respective springs 71, 72 and 73, the successive members 56, 57 and 58 offer a greater resistance to the movement of the plane along the rails 14 and 15, until the craft now resting upon the devices 28—30—32, and 29—31—33 is stopped, when these devices come to rest somewhere along rails 14 and 15, and the whole carriage comes to rest after having rolled a sufficient distance to absorb the momentum imparted thereto by the landing craft. In case the devices 28—30—32 and 29—31—33 are moved to the ends of the corresponding rails 14 and 15 because of excessive momentum of the landing craft, the movement thereof is halted by respective stops 48 and 49. It will be seen that the front wheels 16 and 17 are placed considerably forward of the point where the craft comes to rest and that the center of gravity thereof is low, so that the carriage is perfectly stable and there is no tendency to nose over because of the momentum of the craft. The carriage may be arranged to roll upon rails if desired, and the wheels may be fitted with brakes in conformance with well-known practice.

One of the members 56, 57 and 58 performs the additional function of securing the craft on the carriage so that it will not slide backward because of a sudden forward jump of the hole carriage when the craft lands. Taking member 58, for example, it will be seen that as the craft tilts it forward because of the momentum of the craft, the spring 73 thereof immediately returns it to its vertical position after the wings of the craft have passed, and because the member 58 cannot be rotated backwards as it is prevented from doing so by stop 70, the plane cannot slip backwards on the carriage, but is held in place thereon.

While a preferred embodiment of this invention has been illustrated and described herein, it is apparent that the invention is not limited thereby, but is susceptible of many alterations in form and detail within its scope, depending upon the various conditions under which the device is used.

I claim:

1. In a landing carriage for aircraft, the combination of a frame, means on said frame for receiving the landing craft, said means being movable along said frame in response to the impact of the craft, and a mobile support for said frame.

2. In a landing carriage for aircraft, the combination of a frame, shock absorbing means movable along said frame for receiving the landing craft, and a mobile support for said frame.

3. In a landing carriage for aircraft, the combination of a frame, means mounted in said frame for receiving the landing craft, said means being movable relatively to said frame in response to the impact of the craft, and means for retarding the movement of said means.

4. In a landing carriage for aircraft, the combination of a frame, means mounted on said frame for receiving the landing craft, said means being movable relatively to said frame in response to the impact of the craft, and brakes for said means acting in proportion to the distance of movement of said means.

5. In a landing carriage for aircraft, the combination of a frame, means mounted on said frame for receiving the landing craft, said means being movable relatively to said frame in response to the impact of the craft, means for retarding the movement of said means, and a mobile support for said frame.

6. In a landing carriage for aircraft, the combination of a frame, means mounted on said frame for receiving the landing craft, said means being movable relatively to said frame in response to the impact of the craft, and means on said frame for retarding the movement of the craft along the frame.

7. In a landing carriage for aircraft, the combination of a frame for receiving the landing aircraft, said frame being movable relative to its support in response to the impact of the craft and a series of means on said frame for progressively retarding the movement of the craft on said frame.

8. In a landing carriage for aircraft, the combination of a frame for receiving the landing aircraft, a series of means on said frame for progressively retarding the movement of the craft on said frame, and a mobile support for said frame.

9. In a landing carriage for aircraft, the combination of a frame, movable means on said frame for receiving the landing craft, and means on said frame cooperating with said craft for preventing reverse movement of the craft thereon.

10. In a landing carriage for aircraft, the combination of a frame, movable means on said frame for receiving the landing craft, and a series of members on said frame for progressively retarding the movement of the craft on said means.

11. In a landing carriage for aircraft, the combination of a frame, at least one rail mounted on said frame, a member slidably mounted on said rail for receiving the landing craft, said member being adapted to slide on said rail in response to impact of the craft therewith, means for retarding the movement of said member on said rail, and means for preventing reverse movement of the craft on said member, and a mobile support for said frame whereby it is movable along the ground in response to impact of said craft.

12. In a landing carriage for aircraft, the combination of a frame, means mounted on said frame for receiving the landing craft, shock absorbing devices associated with said means, said means and devices being movable relatively to said frame in response to the impact of the craft, and means on said frame for retarding the movement of said means and devices relatively to said frame.

In testimony whereof I affix my signature.

WILLIAM S. GLENNAN.